United States Patent
Orzechowski et al.

(10) Patent No.: US 12,336,675 B2
(45) Date of Patent: Jun. 24, 2025

(54) OBSTACLE AVOIDANCE USING FUSED DEPTH AND INTENSITY FROM NNT TRAINING

(71) Applicant: Vorwerk & Co. Interholding Gmb, Wuppertal (DE)

(72) Inventors: Pawel Orzechowski, San Jose, CA (US); Mark Wilson, San Jose, CA (US); Ron Domingo, San Jose, CA (US); Stephanie Blankley, San Jose, CA (US)

(73) Assignee: Vorwerk & Co. Interholding Gmb, Wuppertal (DE)

( * ) Notice: Subject to any disclaimer, the term of this patent is extended or adjusted under 35 U.S.C. 154(b) by 316 days.

(21) Appl. No.: 17/718,192

(22) Filed: Apr. 11, 2022

(65) Prior Publication Data
US 2023/0320551 A1  Oct. 12, 2023

(51) Int. Cl.
| | |
|---|---|
| *A47L 11/40* | (2006.01) |
| *G05D 1/00* | (2006.01) |
| *G06V 10/56* | (2022.01) |
| *G06V 10/75* | (2022.01) |
| *G06V 10/80* | (2022.01) |
| *G06V 10/82* | (2022.01) |

(52) U.S. Cl.
CPC ........ *A47L 11/4011* (2013.01); *G05D 1/0238* (2013.01); *G05D 1/0246* (2013.01); *G06V 10/56* (2022.01); *G06V 10/751* (2022.01); *G06V 10/803* (2022.01); *G06V 10/82* (2022.01); *A47L 2201/04* (2013.01)

(58) Field of Classification Search
None
See application file for complete search history.

(56) References Cited

U.S. PATENT DOCUMENTS

| | | | |
|---|---|---|---|
| 6,825,455 | B1 | 11/2004 | Schwarte |
| 8,855,914 | B1 | 10/2014 | Alexander et al. |
| 8,862,271 | B2 | 10/2014 | Shamlian et al. |
| 8,903,589 | B2 | 12/2014 | Sofman et al. |
| 8,996,172 | B2 | 3/2015 | Shah et al. |

(Continued)

FOREIGN PATENT DOCUMENTS

GB    2509814 A    7/2014

OTHER PUBLICATIONS

Lindner, et al., "Data-Fusion of PMD-Based Distance-Information and High-Resolution RGB-Images," Proc. of the Int. Sympt. On Signals, Circuits & Systems, 2007 4 pages.

(Continued)

*Primary Examiner* — Jason Holloway
(74) *Attorney, Agent, or Firm* — Kilpatrick Townsend & Stockton LLP

(57) ABSTRACT

Embodiments provide a method for obstacle avoidance in a mobile robot. Images of objects are captured with mobile robot image sensors with a floor level perspective. Data corresponding to the images is used to train a neural network. The identified objects are classified by indicating whether the objects are a potential hazard. In one embodiment, an image sensor on a robot provides intensity and depth data for each of a plurality of pixels of the images. The intensity and depth data are fused to produce fused data. The fused data is then used to train the neural network.

12 Claims, 9 Drawing Sheets

(56) References Cited

U.S. PATENT DOCUMENTS

| | | |
|---|---|---|
| 10,436,883 B2 | 10/2019 | Sommer et al. |
| 2005/0171644 A1 | 8/2005 | Tani |
| 2009/0133720 A1 | 5/2009 | Van Den Bogert |
| 2012/0098935 A1* | 4/2012 | Schmidt ................ G01S 17/894 348/46 |
| 2012/0176476 A1* | 7/2012 | Schmidt ................ G01S 17/894 348/46 |
| 2012/0221187 A1 | 8/2012 | Jeon |
| 2014/0188325 A1 | 7/2014 | Johnson et al. |
| 2015/0117708 A1* | 4/2015 | Guigues .................. G06T 7/246 382/103 |
| 2015/0289743 A1 | 10/2015 | Taoka et al. |
| 2016/0167226 A1* | 6/2016 | Schnittman ........... G06F 18/217 901/1 |
| 2016/0278599 A1* | 9/2016 | Seo ....................... G05D 1/0022 |
| 2018/0259628 A1* | 9/2018 | Plank ....................... G01S 7/497 |
| 2018/0284786 A1 | 10/2018 | Moshkina-Martinson et al. |
| 2018/0348783 A1* | 12/2018 | Pitzer ..................... G06V 20/20 |
| 2019/0154834 A1* | 5/2019 | Heidrich ................. G01S 17/89 |
| 2021/0049376 A1* | 2/2021 | Cui ........................ G06N 20/00 |

OTHER PUBLICATIONS

Ringbeck et al., "A 3D of Flight Camera for Object Detection," Optical 3-D Measurement Techniques, 2007, 10 pages.

\* cited by examiner

OBSTACLE AVOIDANCE USING FUSED DEPTH AND INTENSITY FROM NNT TRAINING

BACKGROUND OF THE INVENTION

The present invention relates to robots which collect images, and in particular to low profile cleaning robots with image detection capabilities.

Image detection and object classification has been used in many fields. There have been proposals to provide image recognition in household robots, such as cleaning robots. For example, US Pub. 20150289743 describes image recognition to determine a kind of dirt (e.g., hairs, spilled food) and select the appropriate cleaning capability. US Pub. 20160167226 describes loading training data into the memory of a cleaning robot for use in machine learning for object recognition and classification, and also describes machine learning alternately implemented on remote servers over the Internet. Machine learning to detect objects typically involves training a neural network using libraries of object images available online.

In addition to object detection, it is desirable to avoid obstacles by a cleaning robot. Neato Robotics uses infrared scanning lasers to detect the distance to obstacles. The distance to an obstacle can be determined using triangulation with a returned beam, using Time of Flight (TOF), or other methods. The laser can be on a rotating mount to detect obstacles, and map an environment, in all directions. Alternately, a non-moving laser emitter and detector can be used to give a 360 degree view, such as the PMD Technologies 3D sensor for TOF. In addition to image intensity, depth information can be provided by the PMD sensor, or by stereo cameras.

BRIEF SUMMARY OF THE INVENTION

Embodiments provide a method for obstacle avoidance in a mobile robot. Images of objects are captured with image sensors in mobile robots. The image sensors have a perspective within one foot of a surface upon which the mobile robots travel. Data corresponding to the images is transmitted to a remote neural network. The remote neural network is trained using machine learning by identifying and adding tags to the objects. The identified objects are classified by indicating whether the objects are a potential hazard. A library of identified and classified objects is created. A new image from an operating robot is compared to the library of identified and classified objects. A match of the new image to the library of identified and classified objects is identified. A hazard classification is provided to the operating robot. The operation of the operating robot is altered if the hazard classification is received.

Embodiments provide improved accuracy of obstacle detection by a robot, such as a cleaning robot. Object recognition is used to determine whether on object is an obstacle that should be avoided, or is something that can be run over and picked up by a cleaning robot, such as a dust ball or spider web. Cleaning robots are typically short, and have a unique, floor-level viewpoint of objects, such as seeing chairs and legs from the bottom, not the top. This can cause misidentification when using a neural network trained by online images from other perspectives. Thus, embodiments use images captured by cleaning robots to train a neural network for machine learning. The objects in these images can be identified by humans and/or comparison to images in online libraries with different viewpoints.

In one embodiment, an image sensor on a robot provides intensity and depth data for each of a plurality of pixels of the images. The intensity and depth data are presented together for each pixel, providing "fused" data. The fused data is then used to train a neural network. This provides more differentiation and measurement richness for the neural network.

In one embodiment, the neural network is a multi-layer neural network. A high-fidelity model is trained on simultaneous depth and intensity images collected by a PMD time-of-flight camera. The fused depth and intensity data is used to train the multi-layer neural network.

DETAILED DESCRIPTION OF THE INVENTION

Overall Architecture

Figure 1:
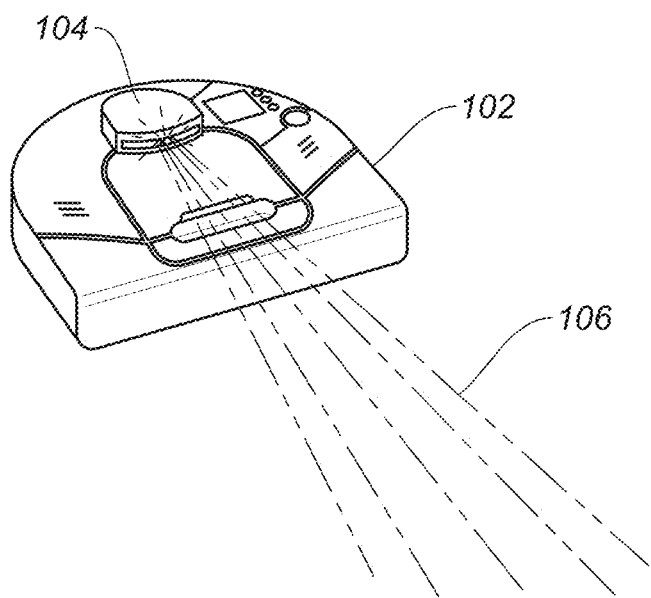
FIG. 1 is a diagram of a cleaning robot with a LIDAR turret according to an embodiment.

FIG. 1 is a diagram of a cleaning robot with a LIDAR turret according to an embodiment. A cleaning robot 102 has a LIDAR (Light Detection and Ranging) turret 104 which emits a light beam 106. The light beam in one embodiment is directed in a line or array with a wide field of view, such as 90, 180, 270 or 360 degrees. The light beam can come from a single or multiple light sources, such as a laser diode or LED. The field of view can be generated with optics in a fixed turret 104, such as with a PMD sensor (Photonic Mixer Device), or by rotating the turret 104. Detected reflections of the light beam off objects are used to calculate both the distance to objects and the location of the cleaning robot. One embodiment of the distance calculation is set forth in U.S. Pat. No. 8,996,172, "Distance sensor system and method," the disclosure of which is incorporated herein by reference. The collected data is also used to create a map, using a SLAM (Simultaneous Location and Mapping) algorithm. One embodiment of a SLAM algorithm is described in U.S. Pat. No. 8,903,589, "Method and apparatus for simultaneous localization and mapping of mobile robot environment," the disclosure of which is incorporated herein by reference.

Figure 2:
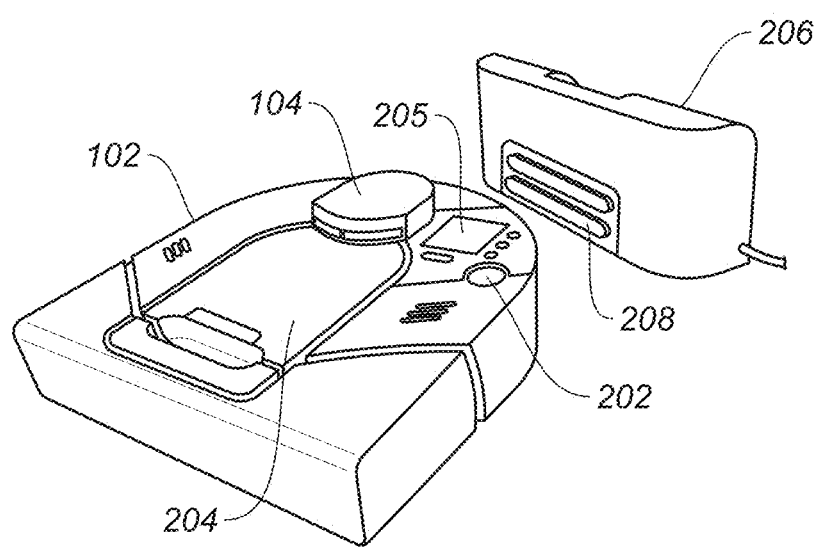
FIG. 2 is a diagram of a cleaning robot and charging station according to an embodiment.

FIG. 2 is a diagram of a cleaning robot and charging station according to an embodiment. Cleaning robot 102 with turret 104 is shown. Also shown is a cover 204 which can be opened to access a dirt collection bag and the top side of a brush. Buttons 202 allow basic operations of the robot cleaner, such as starting a cleaning operation. A display 205 provides information to the user. Cleaning robot 102 can dock with a charging station 206, and receive electricity through charging contacts 208.

Figure 3:
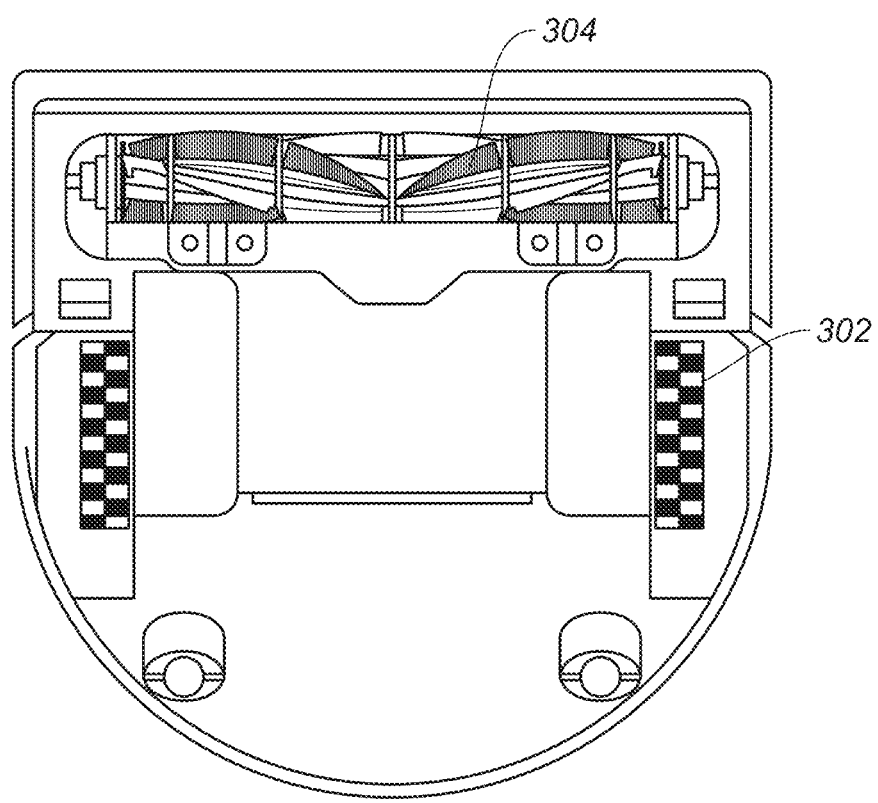
FIG. 3 is a diagram of the underside of a cleaning robot according to an embodiment.

FIG. 3 is a diagram of the underside of a cleaning robot according to an embodiment. Wheels 302 move the cleaning robot, and a brush 304 helps free dirt to be vacuumed into the dirt bag.

Figure 4:
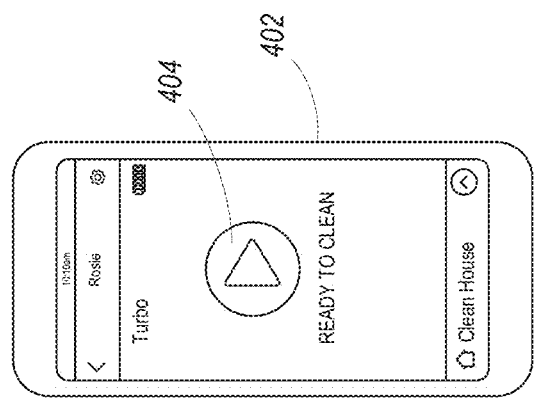
FIG. 4 is a diagram of a smartphone control application display for a cleaning robot according to an embodiment.

FIG. 4 is a diagram of a smartphone control application display for a cleaning robot according to an embodiment. A smartphone 402 has an application that is downloaded to control the cleaning robot. An easy to use interface has a start button 404 to initiate cleaning.

Figure 5:
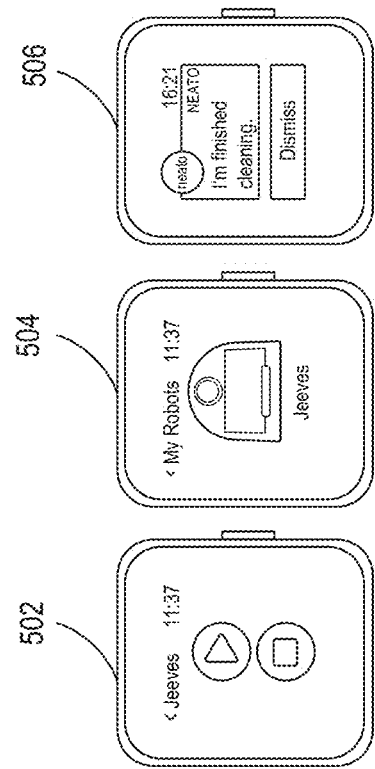
FIG. 5 is a diagram of a smart watch control application display for a cleaning robot according to an embodiment.

FIG. 5 is a diagram of a smart watch control application display for a cleaning robot according to an embodiment. Example displays are shown. A display 502 provides an easy to use start button. A display 504 provides the ability to control multiple cleaning robots. A display 506 provides feedback to the user, such as a message that the cleaning robot has finished.

Figure 6:
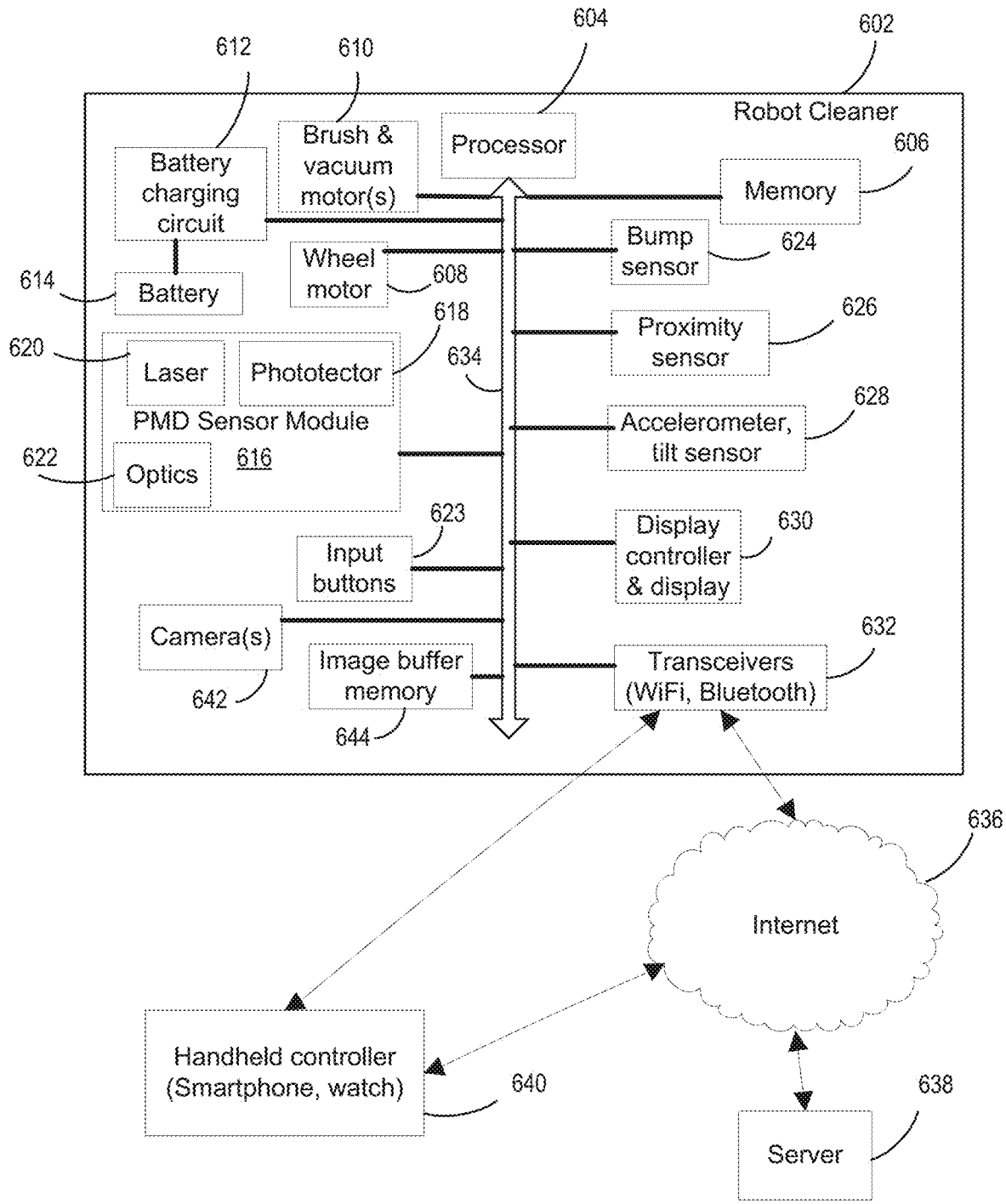
FIG. 6 is a diagram of a the electronic system for a cleaning robot according to an embodiment.

FIG. 6 is a high level diagram of a the electronic system for a cleaning robot according to an embodiment. A cleaning robot 602 includes a processor 604 that operates a program downloaded to memory 606. The processor communicates with other components using a bus 634 or other electrical connections. In a cleaning mode, wheel motors 608 control the wheels independently to move and steer the robot. Brush and vacuum motors 610 clean the floor, and can be operated in different modes, such as a higher power intensive cleaning mode or a normal power mode.

PMD (Photonic Mixer Device) module 616 includes a laser 620, a detector 616 and optics 622 for directing a laser beam across a wide field of view. Alternately, instead of a stationary PMD, a turret motor could move a laser and detector to detect objects up to 360 degrees around the cleaning robot. Various sensors provide inputs to processor 604, such as a bump sensor 624 indicating contact with an object, proximity sensor 626 indicating closeness to an object, and accelerometer and tilt sensors 628, which indicate a drop-off (e.g., stairs) or a tilting of the cleaning robot (e.g., upon climbing over an obstacle). Examples of the usage of such sensors for navigation and other controls of the cleaning robot are set forth in U.S. Pat. No. 8,855,914, "Method and apparatus for traversing corners of a floored area with a robotic surface treatment apparatus," the disclosure of which is incorporated herein by reference. Other sensors may be included in other embodiments, such as a dirt sensor for detecting the amount of dirt being vacuumed, a motor current sensor for detecting when the motor is overloaded, such as due to being entangled in something, a floor sensor for detecting the type of floor, and an image sensor (camera) for providing images of the environment and objects.

A battery 614 provides power to the rest of the electronics though power connections (not shown). A battery charging circuit 612 provides charging current to battery 614 when the cleaning robot is docked with charging station 206 of FIG. 2. Input buttons 623 allow control of robot cleaner 602 directly, in conjunction with a display 630. Alternately, cleaning robot 602 may be controlled remotely, and send data to remote locations, through transceivers 632.

Through the Internet 636, and/or other network(s), the cleaning robot can be controlled, and can send information back to a remote user. A remote server 638 can provide commands, and can process data uploaded from the cleaning robot. A handheld smartphone or watch 640 can be operated by a user to send commands either directly to cleaning robot 602 (through Bluetooth, direct RF, a WiFi LAN, etc.) or can send commands through a connection to the internet 636. The commands could be sent to server 638 for further processing, then forwarded in modified form to cleaning robot 602 over the internet 636.

A camera or cameras 642 captures images of objects near the robot cleaner. In one embodiment, at least one camera is positioned to obtain images in front of the robot, showing where the robot is heading. The images are buffered in an image buffer memory 644. The images may be video, or a series of still images. These images are stored for a certain period of time, such as 15 seconds-2 minutes, or up to 10 minutes, or for an entire cleaning operation between leaving a charging station and returning to the charging station. The images may subsequently be written over.

Computer Systems for Media Platform and Client System

Figure 7:
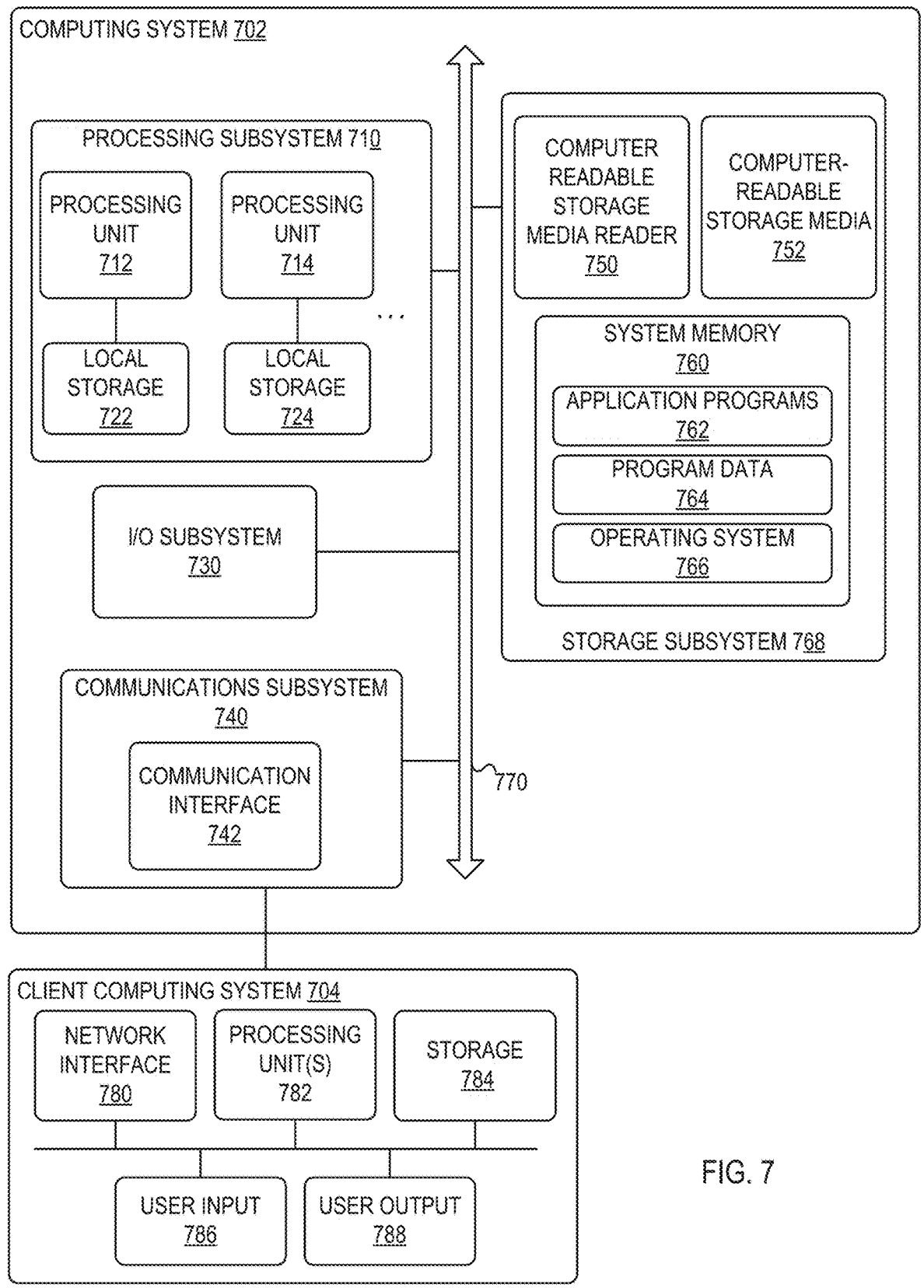
FIG. 7 is a simplified block diagram of a representative computing system and client computing system usable to implement certain embodiments of the present invention.

Various operations described herein may be implemented on computer systems. FIG. 7 shows a simplified block diagram of a representative computing system 702 and client computing system 704 usable to implement certain embodiments of the present invention. In various embodiments, computing system 702 or similar systems may implement the cleaning robot processor system, remote server, or any other computing system described herein or portions thereof. Client computing system 704 or similar systems may implement user devices such as a smartphone or watch with a robot cleaner application.

Computing system 702 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 702 may include processing subsystem 710. Processing subsystem 710 may communicate with a number of peripheral systems via bus subsystem 770. These peripheral systems may include I/O subsystem 730, storage subsystem 768, and communications subsystem 740.

Bus subsystem 770 provides a mechanism for letting the various components and subsystems of server computing system 704 communicate with each other as intended. Although bus subsystem 770 is shown schematically as a single bus, alternative embodiments of the bus subsystem may utilize multiple buses. Bus subsystem 770 may form a local area network that supports communication in processing subsystem 710 and other components of server computing system 702. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 730 may include devices and mechanisms for inputting information to computing system 702 and/or for outputting information from or via computing system 702. In general, use of the term "input device" is intended to include all possible types of devices and mechanisms for inputting information to computing system 702. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 702 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 710 controls the operation of computing system 702 and may comprise one or more processing units 712, 714, etc. A processing unit may include one or more processors, including single core processor or multicore processors, one or more cores of processors, or combinations thereof. In some embodiments, processing subsystem 710 may include one or more special purpose co-processors such as graphics processors, digital signal processors (DSPs), or the like. In some embodiments, some or all of the processing units of processing subsystem 710 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 722, 724. Any type of processors in any combination may be included in processing unit(s) 712, 714.

In some embodiments, processing subsystem 710 may be implemented in a modular design that incorporates any number of modules (e.g., blades in a blade server implementation). Each module may include processing unit(s) and local storage. For example, processing subsystem 710 may include processing unit 712 and corresponding local storage 722, and processing unit 714 and corresponding local storage 724.

Local storage 722, 724 may include volatile storage media (e.g., conventional DRAM, SRAM, SDRAM, or the like) and/or non-volatile storage media (e.g., magnetic or optical disk, flash memory, or the like). Storage media incorporated in local storage 722, 724 may be fixed, removable or upgradeable as desired. Local storage 722, 724 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 712, 714 need at runtime. The ROM may store static data and instructions that are needed by processing unit(s) 712, 714. The permanent storage device may be a non-volatile read-and-write memory device that may store instructions and data even when a module including one or more processing units 712, 714 and local storage 722, 724 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 722, 724 may store one or more software programs to be executed by processing unit(s) 712, 714, such as an operating system and/or programs implementing various server functions such as functions of UPP system 102, or any other server(s) associated with UPP system 102. "Software" refers generally to sequences of instructions that, when executed by processing unit(s) 712, 714 cause computing system 702 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 712, 714. In some embodiments the instructions may be stored by storage subsystem 768 (e.g., computer readable storage media). In various embodiments, the processing units may execute a variety of programs or code instructions and may maintain multiple concurrently executing programs or processes. At any given time, some or all of the program code to be executed may be resident in local storage 722, 724 and/or in storage subsystem including potentially on one or more storage devices. Software may be implemented as a single program or a collection of separate programs or program modules that interact as desired. From local storage 722, 724 (or non-local storage described below), processing unit(s) 712, 714 may retrieve program instructions to execute and data to process in order to execute various operations described above.

Storage subsystem 768 provides a repository or data store for storing information that is used by computing system 702. Storage subsystem 768 provides a tangible non-transitory computer-readable storage medium for storing the basic programming and data constructs that provide the functionality of some embodiments. Software (programs, code modules, instructions) that when executed by processing subsystem 710 provide the functionality described above may be stored in storage subsystem 768. The software may be executed by one or more processing units of processing subsystem 710. Storage subsystem 768 may also provide a repository for storing data used in accordance with the present invention.

Storage subsystem 768 may include one or more non-transitory memory devices, including volatile and non-volatile memory devices. As shown in FIG. 7, storage subsystem 768 includes a system memory 760 and a computer-readable storage media 752. System memory 760 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 702, such as during start-up, may typically be stored in the ROM. The RAM typically contains data and/or program modules that are presently being operated and executed by processing subsystem 710. In some implementations, system memory 760 may include multiple different types of memory, such as static random access memory (SRAM) or dynamic random access memory (DRAM). Storage subsystem 768 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 768.

By way of example, and not limitation, as depicted in FIG. 7, system memory 760 may store application programs 762, which may include client applications, Web browsers, mid-tier applications, relational database management systems (RDBMS), etc., program data 764, and one or more operating systems 766. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 752 may store programming and data constructs that provide the functionality of some embodiments. Software (programs, code modules, instructions) that when executed by processing subsystem 710 a processor provide the functionality described above may be stored in storage subsystem 768. By way of example, computer-readable storage media 752 may include non-volatile memory such as a hard disk drive, a magnetic disk drive, an optical disk drive such as a CD ROM, DVD, a Blu-Ray® disk, or other optical media. Computer-readable storage media 752 may include, but is not limited to, Zip® drives, flash memory cards, universal serial bus (USB) flash drives, secure digital (SD) cards, DVD disks, digital video tape, and the like. Computer-readable storage media 752 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 752 may provide storage of computer-readable instructions, data structures, program modules, and other data for computing system 702.

In certain embodiments, storage subsystem 768 may also include a computer-readable storage media reader 750 that may further be connected to computer-readable storage media 752. Together and, optionally, in combination with system memory 760, computer-readable storage media 752 may comprehensively represent remote, local, fixed, and/or removable storage devices plus storage media for storing computer-readable information.

In certain embodiments, computing system 702 may provide support for executing one or more virtual machines. Computing system 702 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 702. Accordingly, multiple operating systems may potentially be run concurrently by computing system 702. Each virtual machine generally runs independently of the other virtual machines.

Communication subsystem 740 provides an interface to other computer systems and networks. Communication subsystem 740 serves as an interface for receiving data from and transmitting data to other systems from computing system 702. For example, communication subsystem 740 may enable computing system 702 to establish a communication channel to one or more client computing devices via the Internet for receiving and sending information from and to the client computing devices.

Communication subsystem 740 may support both wired and/or wireless communication protocols. For example, in certain embodiments, communication subsystem 740 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 740 may provide wired network connectivity (e.g., Ethernet) in addition to or instead of a wireless interface.

Communication subsystem 740 may receive and transmit data in various forms. For example, in some embodiments, communication subsystem 740 may receive input communication in the form of structured and/or unstructured data feeds, event streams, event updates, and the like. For example, communication subsystem 740 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 740 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 740 may also be configured to output the structured and/or unstructured data feeds, event streams, event updates, and the like to one or more databases that may be in communication with one or more streaming data source computers coupled to computing system 702.

Communication subsystem 740 may provide a communication interface 742, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 702 may operate in response to requests received via communication interface 742. Further, in some embodiments, communication interface 742 may connect computing systems 702 to each other, providing scalable systems capable of managing high volumes of activity. Conventional or other techniques for managing server systems and server farms (collections of server systems that cooperate) may be used, including dynamic resource allocation and reallocation.

Computing system 702 may interact with various user-owned or user-operated devices via a wide-area network such as the Internet. An example of a user-operated device is shown in FIG. 7 as client computing system 702. Client computing system 704 may be implemented, for example, as a consumer device such as a smart phone, other mobile phone, tablet computer, wearable computing device (e.g., smart watch, eyeglasses), desktop computer, laptop computer, and so on.

For example, client computing system 704 may communicate with computing system 702 via communication interface 742. Client computing system 704 may include conventional computer components such as processing unit(s) 782, storage device 784, network interface 780, user input device 786, and user output device 788. Client computing system 704 may be a computing device implemented in a variety of form factors, such as a desktop computer, laptop computer, tablet computer, smart phone, other mobile computing device, wearable computing device, or the like.

Processing unit(s) 782 and storage device 784 may be similar to processing unit(s) 712, 714 and local storage 722, 724 described above. Suitable devices may be selected based on the demands to be placed on client computing system 704; for example, client computing system 704 may be implemented as a "thin" client with limited processing capability or as a high-powered computing device. Client computing system 704 may be provisioned with program code executable by processing unit(s) 782 to enable various interactions with computing system 702 of a message management service such as accessing messages, performing actions on messages, and other interactions described above. Some client computing systems 704 may also interact with a messaging service independently of the message management service.

Network interface 780 may provide a connection to a wide area network (e.g., the Internet) to which communication interface 740 of computing system 702 is also connected. In various embodiments, network interface 780 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 786 may include any device (or devices) via which a user may provide signals to client computing system 704; client computing system 704 may interpret the signals as indicative of particular user requests or information. In various embodiments, user input device 786 may include any or all of a keyboard, touch pad, touch screen, mouse or other pointing device, scroll wheel, click wheel, dial, button, switch, keypad, microphone, and so on.

User output device 788 may include any device via which client computing system 704 may provide information to a user. For example, user output device 788 may include a display to display images generated by or delivered to client computing system 704. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 788 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 712, 714 and 782 may provide various functionality for computing system 702 and client computing system 704, including any of the functionality described herein as being performed by a server or client, or other functionality associated with message management services.

It will be appreciated that computing system 702 and client computing system 704 are illustrative and that variations and modifications are possible. Computer systems used in connection with embodiments of the present invention may have other capabilities not specifically described here. Further, while computing system 702 and client computing system 704 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

Training Neural Network with Robot Images

Figure 8:
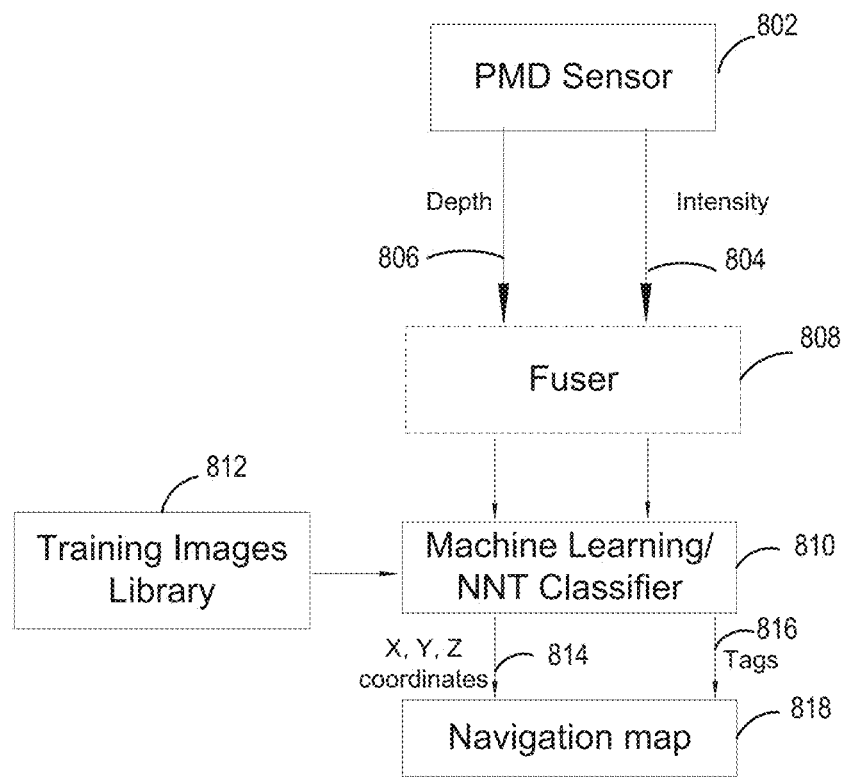
FIG. 8 is a diagram of a training mechanism using fused intensity and depth images according to an embodiment.

FIG. 8 is a diagram of a training mechanism using fused intensity and depth images according to an embodiment. A PMD sensor 802 provides intensity data 804 and depth data 806 for each pixel in an image captured by a robot. The PMD sensor is mounted near the top of a low profile cleaning robot in one embodiment, less than a foot above the surface on which the robot rests, or less than 6 inches in one embodiment. The pixels in the image data correspond to a wide field of view around the robot, ranging from 90-360 degrees. The images may appear somewhat curved due to the different locations of the optics for each pixel position. However, by comparing to similarly captured images, themselves distorted, any distortion actually aids in the identification of the object.

In one embodiment, an optional Fuser Module 808 receives the depth data 806 and intensity data 804 for each pixel in an image and modifies the data. Alternately, the raw data from PMD sensor 802 can simply be buffered or passed to a Machine Learning Module 810, such as a Neural Network (NNT). The Fuser Module 808 can reformat the data or assign each depth and intensity value to an X,Y pixel position corresponding to the pixel being read. In one embodiment, in addition to simple grayscale or intensity data, the sensor or an additional sensor can provide color images, such as RGB data for each pixel in the image.

In an alternate embodiment, rather than providing depth and intensity/color data separately, the fusion can be any mathematical combination of the depth and intensity data. This provides a single, combined number for each pixel corresponding to intensity and depth. The mathematical operation is multiplying the intensity data by the depth data in one embodiment. Alternately, the intensity and depth data are added. Alternately the intensity is divided by the depth, or vice-versa. Alternately, the depth and intensity are fed into a polynomial equation. In one embodiment, the depth and intensity data are numbers, such as a distance from a reference point for the depth. The intensity can be can simply be a number from 1-10, or 1-100. The mathematical relation, or the units used, or any normalization can be used to weight the depth and intensity the same or differently. For example, if it is determined that intensity is a better indicator of an object than depth, the intensity may be given a higher weighting to have a higher impact on the comparison. The weighting can also be done by multiplying by a weighting factor.

In one embodiment, a Machine Learning/NNT classifier 810 classifies the object and tags it with a classification. This can be done by comparison to identified objects in a training images library 812. Training images library 812 can initially be populated by humans identifying images, or from online libraries. In one embodiment, the online libraries are replaced by images taken by other robots with a similar low profile viewpoint. The objects can be tagged by a type descriptor (e.g., sock, yarn, ball, key, paper, tissue, etc.) and/or an indication of whether or not it is considered a hazard for the robot (together, tags 816). For example, a small paper may not be a hazard for a cleaning robot, but larger paper may be a hazard.

The depth information can be used by NNT classifier 810 to locate in the image objects to be identified. The contours of an object on the floor will be revealed by a large change in depth between the perimeter of the object and the wall behind it. Thus, when color and intensity of an object and the background are similar, the depth information allows isolation of the object. In addition, the NNT will learn that only objects on the floor are potential obstacles, not patterns on a wall, things supported or hanging above the robot height (e.g., the bottom of a chair), etc.

In an alternate embodiment, NNT 818 is trained without using fused depth and intensity data. Instead, NNT 818 is trained using object images from the perspective of low profile cleaning robots. This provides a viewpoint that more closely approximates the viewpoint encountered in the field, compared to online images of objects which are often from a higher perspective. Training with such objects will increase the accuracy of correct object identification and reduce the effect of incorrect identifications on the performance of the robot. The images provided may be only intensity, only depth, or both provided separately, and not fused. The images may be provided by any type of sensor, not just a PMD sensor. For example, images from a detector on a rotating turret may be used. Alternately, another type of depth sensor may be used, such as stereo cameras.

In one embodiment, the cleaning robot includes a camera, and can upload pictures through a Wireless Local Area Network (WLAN) and the Internet to a server or other computer that performs object recognition. PMD sensor 802 and fuser 808 are on the robot in one embodiment, while machine learning/NNT classifier 810 and training images library 812 are at a remote server. Upon determining whether there are any hazards in an image, a navigation map 818 is annotated with the obstacle location. In one embodiment, the obstacle coordinates are downloaded to the robot for populating a navigation map on the robot.

Cleaning robots in the field can be used to provide the images to populate the training images library 812. As noted above, these can initially be classified using an online library or having a human identify the object. For example, the customer owner of the cleaning robot may be sent the image and be asked to identify the object. The customer can also be asked to provide a tag, indicating whether the customer considers it a hazard to be avoided or not. Alternately, it can be inferred to be a hazard if the customer alters the operation of the robot (e.g., stops the robot and picks up the object). Note that a "hazard" may not simply be something that could damage the robot or adversely impact its performance. A "hazard" could also be something valuable (e.g., keys, coins, a pen, etc.) that the customer does not want lost in a vacuum bag.

Embodiments provide improved accuracy of obstacle detection by a robot, such as a cleaning robot. Object recognition is used to determine whether on object is an obstacle that should be avoided, or is something that can be run over and picked up by a cleaning robot, such as a dust ball or spider web. Cleaning robots are typically short, and have a unique, floor-level viewpoint of objects, such as seeing chairs and legs from the bottom, not the top. This can cause misidentification when using a neural network trained by online images from other perspectives. Thus, embodiments use images captured by cleaning robots to train a neural network for machine learning. The objects in these images can be identified by humans and/or comparison to images in online libraries with different viewpoints.

Embodiments provide practical and economic methods and apparatus for obstacle avoidance. The obstacle avoidance algorithm is based on machine deep-learning neural networks algorithms. The high-fidelity model is trained on simultaneous depth and intensity images collected by PMD's time-of-flight camera. The depth and intensity images are fused and then used to train the multi-layer neural network, this provides more differentiation and measurement richness for the neural nets.

The neural net training process itself is novel as it is based on images collected with the PMD sensor or another Time of Flight (ToF) camera sensor mounted on production like robot, rather than image databases published on online. This ensures physical appearance of the objects mimics true representation of objects as observed by robots running out in the field. In addition, virtual boundaries are used to block the robot from going over obstacles and allowing the sensor to see and capture the data in a highly predictable and controllable environment. The location and the characteristics of obstacles are known apriori and are used to train for both location and object classification.

Intensity and Depth Measurements

There are multiple methods for distance measurement using a laser beam. These include TOF (time-of-flight) measurement, triangulation, and intensity measurement. The TOF measurement utilizes the time difference between emitted and detected laser pulses. This provides high accuracy for long distances, but can be complex. Triangulation provides good results if the detector is sufficiently far from the emitter to provide sufficient accuracy. Intensity measurement is very simple and can be a good choice for short range distance measurement. This typically involves an intensity modulated laser beam (e.g., with sinusoidal modulation). The difference in the phase of the reflected beam from the phase of the transmitted beam can be mathematically related to the distance to the object causing the reflection. See, e.g., PMD Technologies U.S. Pat. No. 10,436,883 for a description of the phase calculation. The phase is detected as a different intensity. Since the intensity of a laser beam is essentially constant over short distances, the variation in intensity is due to the change in phase.

PMD Sensor

There are multiple methods for generating three dimensional depth maps. Some require mechanical scanning, and others require stereo cameras. In one embodiment, an inexpensive PMD sensor (Photonic Mixer Device) is used. This sensor detects both the intensity and the distance in each pixel. Rather than using a single laser beam which is scanned over the environment, a PMD sensor illuminates the entire environment with modulated light from an array of laser diodes, or using optics to divide the light from a single or limited number of laser diodes. The optics could include a hologram or diffraction grating in one example. The distance is measured by using continuous modulation and measuring the phase delay in each pixel.

In one embodiment, the PMD sensor includes a modulation driver that defines a modulation frequency and signal characteristics, which are important for phase stability and accuracy. A programmable logic device provides the PMD with phase signals and can vary the modulation frequency.

Object Classification

Figure 9:
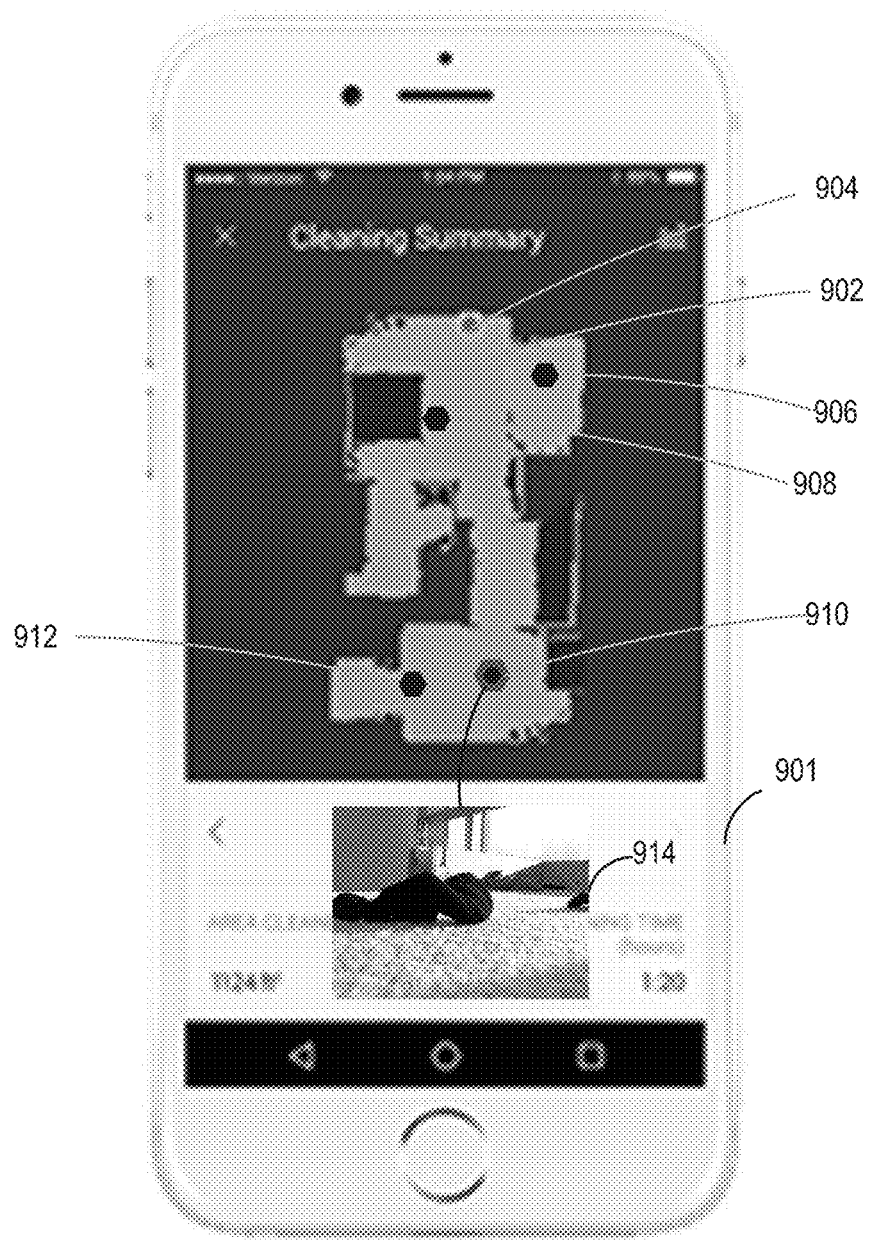
FIG. 9 is a diagram of an embodiment of a cleaning map indicating the locations of detected objects.

FIG. 9 is a diagram of an embodiment of a cleaning map created by a cleaning robot. A smartphone 901 (or tablet or other display device) shows a cleaning area or map 902 that has been mapped. A location of a robot charging station 904 is indicated. Also indicated are objects detected as the robot moved around, with the location on map 902 of objects indicated by icons 906, 908, 910 and 912. A user can touch an icon, such as icon 910, which is highlighted when touched. An image 914 of the object at the location of icon 910 is then displayed. The user can indicate the object is a potential hazard by swiping the image to the right, or indicate that it is not a hazard by swiping to the left. Alternately, other methods of displaying and selecting can be used, such as a list with yes and no buttons.

Figure 10:
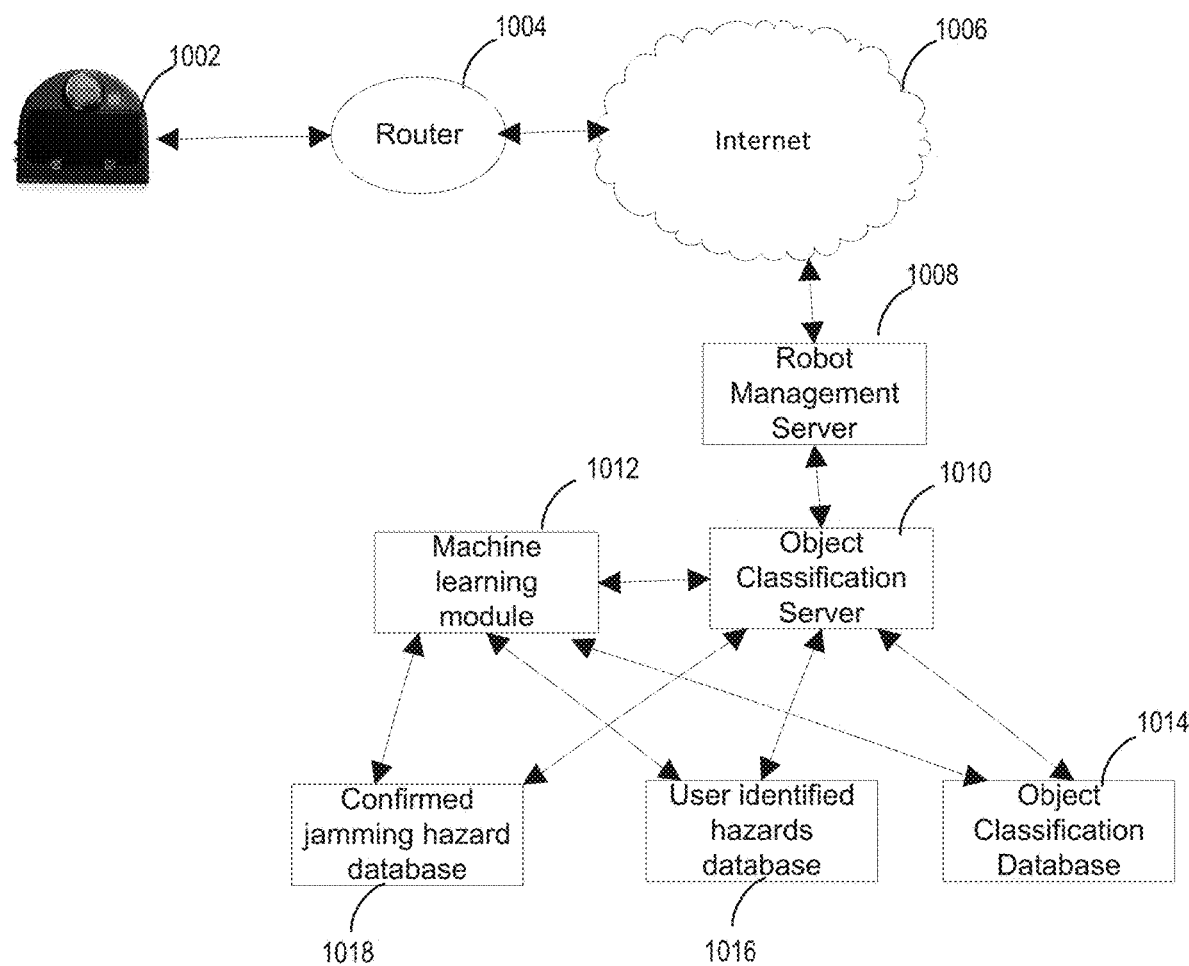
FIG. 10 is a diagram of an embodiment of a system for detecting hazards and classifying objects.

FIG. 10 is a diagram of an embodiment of an asynchronous object classification system. A cleaning robot 1002 uploads images, or portions of images, by WiFi to a router 1004, which is connected to Internet 1006. The images are provided to a robot management server 1008, which can communicate with an application on a user device, such as a smartphone as shown in FIG. 9. Server 1012 also communicates the images to an Object Classification Server 1010. A machine learning module 1012 can be invoked on server 1010, or on a separate server. Three databases are shown, although they could be combined in a single database, or further segmented. An Object Classification Database 1014 is used to store images from robots and training images for machine learning module 1012. Database 1014 is invoked to classify and identify objects in submitted videos.

User identified hazards database 1016 stores images that have been manually identified as hazards by users, such as by the mechanism described in FIG. 9. This can either be used in conjunction with database 1014, or separately. In one embodiment, the images are not classified or identified at all. Rather, if a submitted image is a near match to something identified as a hazard in database 1016, a response to the submitting robot is a probability (90%, 80%, 70%, 50%, etc.) that the object in the image is a hazard. The robot will then avoid the hazard, unless overruled by the user as described further below.

In one embodiment, the robot can identify objects using the intensity/color and depth information from a PMD or similar sensor. The contours of the object can be determined, or simply the changes from a previously generated map can be noted. The object locations are noted on the navigation map, and the robot avoids them while the information is sent to a remote machine learning module for determination whether it is a hazard or not. The robot will asynchronously receive the hazard information later. For objects that are marked as not being hazards, the robot will return to clean those areas. Objects indicated as hazards will continue to be avoided, and the user may be notified of each hazard and its location.

Confirmed jamming hazard database 1018 stores images taken just before a robot became jammed or otherwise rendered inoperable. Again, if a submitted image is a near match to something identified as a hazard in database 1018, a response to the submitting robot is a probability (90%, 80%, 70%, 50%, etc.) that the object in the image is a hazard. The probability indicates the degree of confidence that the object in the submitted image is the same or similar to a confirmed hazard object in database 1018. The robot will then avoid the hazard, unless overruled by the user.

Object classification database 1018, in one embodiment, includes tags for each object indicating whether they are a hazard, and a degree of confidence that they are a hazard. If a submitted image is a near match to something identified as a hazard in object classification database 1014, a response to the submitting robot is a probability that the object in the image is a hazard. This response may be instead of, or in addition to, providing an object classification and/or object identification, along with a degree of confidence in the classification and/or identification.

In one embodiment, submitted messages are compared to images in all three databases, and the response is a weighted combination of the matches from the three databases. In one embodiment, matches from the confirmed jamming hazard database are weighted highest, then matches from the user identified hazard database, then matches from the object classification database.

In one embodiment, as described above, objects are identified as hazards with a percentage probability. Such hazards are then maintained as marked on a map of the environment and are avoided. The default setting for the probability that an object is a hazard is set to being above a default percentage, such as 10-30%. The default setting could be changed manually by a user, or could be part of a cleaning style, such as set forth in co-pending U.S. patent application Ser. No. 15/475,983, filed Mar. 31, 2017, entitled "ROBOT WITH AUTOMATIC STYLES," the disclosure of which is hereby incorporated herein by reference. For example, a "fast" style would automatically set the threshold low, such as somewhere in the range 10-20%, while the "thorough" style would set the threshold higher, to try to clean more potential hazards, such as somewhere in the range 30-50%.

Turning Off Robot Brush

In one embodiment, the robot has a cleaning brush and performs its normal cleaning operation, except that it proceeds with caution over (and around) unknown objects by turning off the brush or reducing the speed. This avoids the primary mode of entanglements. After the object is classified, compared to the user identified database, etc., the robot can return the those areas for a "touch up" cleaning with the brush turned on, if it is safe. In one embodiment, the robot will run over unidentified objects before classification, with the brush off, only if they are detected to be sufficiently small. Sufficiently small may indicated that the robot can pass over the object without contact. Alternately, if the object has been determined to be soft and compressible, an object that will partially contact the brush may be run over.

User Identification of Hazards

In one embodiment, the hazards with a certainty less than a threshold, such as 80-90%, are presented to, or made available to, the user. The display can be the image, such as image 914 in FIG. 9, with or without the probability. The user can then indicate whether the object is indeed a hazard or not. Again, the user can change the default settings to require a higher or lower percentage probability of the object being a hazard before it is presented to the user. The user indications are then added to the user identified hazard database 1016. The images can be sent to robot management server 1008 and then relayed to the user. Alternately, the images can be stored for the use to view the next time the user accesses the application on the user device. A text or other notification can be sent to the user to prompt review in real time. The user can adjust the settings to enable or disable such a notification. Optionally, the user can also input a description of the object (e.g., sock). The user indications of objects as hazards can be uploaded with the images of the hazards as a tag to a hazard database and also an object identification database. A user can elect whether to be prompted to identify hazards at all, or not to be bothered. Incentives may be offered to the user to identify hazards, such as a discount on future purchases. The user may simply indicate whether it is a hazard or not, such as by a right or left swipe, clicking a yes/no button, doing a tap or double tap or X or other gesture, etc. The user can also be prompted to type in an identification, or select from a list of potential matches identified by the remote object classification server.

In one embodiment, user identified hazard database 1016 contains not only images identified as hazards by a user, but also images identified as not being a hazard. Thus, a submitted image can be compared to both. If the image is more similar to a non-hazard image than a hazard image, it can be indicated to have a low probability of being a hazard. Similarly, confirmed jamming hazard database 1018 may also contain images of objects that turned out not to be jamming hazards. This can be images that jammed a robot, but the robot was able to unjam through reversing the brush. This can also be images where an object is detected, but the robot moves over and cleans the object, with no jam occurring. Again, newly submitted images can be compared to both confirmed jamming hazards and confirmed non-hazards. It should be noted that although jamming is described as an example, any other action that renders the robot inoperable or partially inoperable is also covered by jamming, such as requiring increased power due to partial clogging of the robot or the robot getting stuck and unable to move, or trapped in a small area.

In practice, the same object may occur in different images as the robot approaches or goes by the object. In one embodiment, the object classification server does image matching, in combination with analyzing the location data tagged with the images, to determine if the same object is indicated in multiple images. The best image of the object is then returned to the robot. The image may also, or instead, be sent directly to a robot management server, and stored in the database section tagged for the user of that robot. The best image can then be accessed by the user, rather than multiple, duplicate images. The best image will typically be one where the object fills most of the image, but does not overfill it, and has a higher probability of matching an identified object or hazard than other images of the same object.

Corrective Action in Response to Object Detection.

Figure 11:
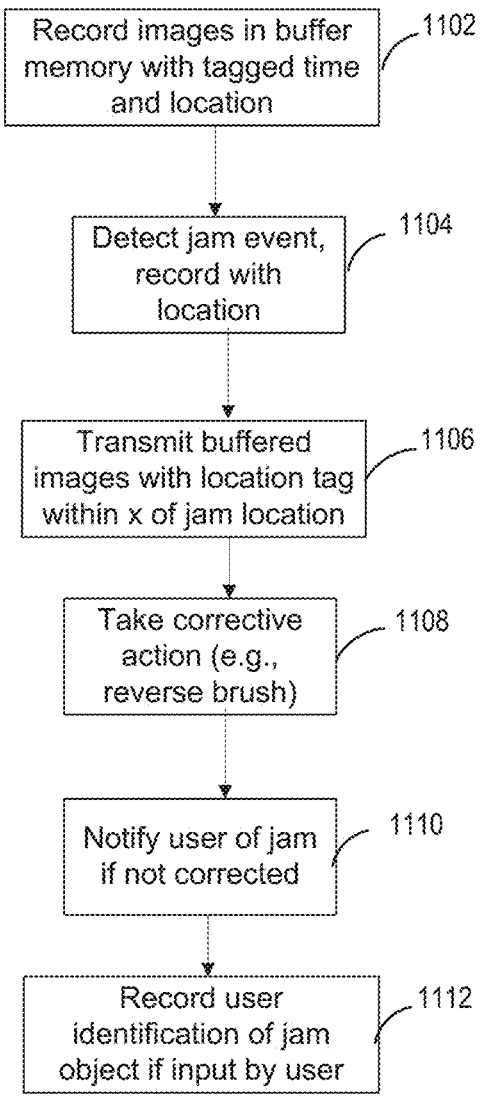
FIG. 11 is a flowchart of an embodiment of a method for detecting hazards and taking corrective action.

FIG. 11 is a flowchart of an embodiment of a method for detecting hazards and taking corrective action. Images are recorded in a buffer memory as the robot moves (1102), and are tagged with a timestamp and x, y location coordinates. As described above, the LIDAR can be used to determine the location of the object relative to the robot, and also to determine the robot location on a map. When a jam event occurs, it is recorded with a location (1104). A jam event includes anything which adversely affects the operability of the robot, such as clogging, requiring increased brush or movement motor power, trapping of the robot, immobilizing of the robot, etc. Such events can be detected with one or more sensors. The LIDAR can detect that the cleaning robot isn't moving. A current or voltage sensor can detect excessive power being required by the cleaning robot motor for translational movement, or the brush or other cleaning motor. The buffered images corresponding to the jammed location are then transmitted to the remote server (1106).

Corrective action can then be taken (1108), such as reversing the direction of rotation of the cleaning brush, allowing the brush to free spin and then backing up the robot, reversing the direction of the robot, increasing the robot brush or translational movement motor power, etc. If the jam event is not corrected, the user is notified (1110). The notification can be an indication on the robot app, a separate text message, or any other notification. The user can be directed to take appropriate action, such as clean the brush, remove, empty and replace the dirt container, pick up and move the robot to an open area, etc. The user can optionally be prompted to identify the object at the location of the jam event, and the user identification can be recorded and transmitted to the remote server (1112). Thus, the remote server may receive multiple types of tagged images: images tagged as causing a jam that was automatically overcome, images tagged as causing a jam that was not overcome, and images that caused a jam and have been labeled by a user.

Embodiments provide practical and economic methods and apparatus for asynchronously classifying images provided by a robot. Doing object identification using the processor in a robot in real time would make the robot more expensive. Since the robot takes a fair amount of time to do cleaning, and objects can be bypassed and returned to, real-time decisions are not needed such as would be needed in self-driving cars, for example. In a reconnaissance/exploratory or first cleaning pass, unidentified objects are simply avoided. Images of the object are uploaded over the Internet to a remote object detection and classification system, and the location is indicated by the cleaning robot. When the remote system subsequently returns an object identification or classification, the object can be indicated as something to be avoided, or the cleaning robot can return to the location and clean over the object if it is determined not to be a hazard. The classification of the object need not identify the object, but can simply be an indication that it is a potential hazard to the robot. New images and objects are compared to the tagged hazards database to identify hazards. This eliminates the need for object recognition and classification—the robot will simply know that such an object is a hazard and has impacted other robots adversely.

In one embodiment, the cleaning robot can obtain additional information about the object. The additional information, or some additional information may be obtained upon the first encounter with the object. Alternately, the cleaning robot may return to the object when object classification is indefinite. The additional information can be additional image views of the object from different directions or angles. Multiple cameras on the cleaning robot can capture different angles, or the cleaning robot can be maneuvered around the object for different views. A bump or pressure sensor can be used with slight contact with the object to determine if it is hard or soft. For example, after detecting initial contact, the robot can continue to move for ½ inch to see if the object compresses or moves. The difference between the object moving (indicating it is hard) and compressing (indicating it is soft) can be determined by the amount of pressure detected on a bump sensor (with, in general, more pressure from a hard, moving object) and/or images or the LIDAR indicating that the object has moved after the robot initiates contact and then withdraws from contact.

Alternately, an identification of hardness or softness can come from identifying the type of material through machine learning, based on depth and intensity/color information.

Questionnaire

In one embodiment, a user completes a questionnaire and the answers are used to filter the potential object matches. For example, if the user does not have a pet, dog poop can be eliminated from the possible object classification. Conversely, if a user has a dog, dog poop can be added to the list of potential objects with a higher weighting of likelihood of a match. If a user has kids, toys can be weighted higher, or eliminated if a user doesn't have kids. Indicating birthdays can be used to increase the likelihood weighting of wrapping paper and ribbons around the time of the birthday. Other calendar dates can be used to increase the likelihood weighting, such as wrapping paper or ornaments around Christmas.

In one embodiment, the type of object detected may change the cleaning mode. For example, the detection of a throw rug on a wood or tile floor can change the brush mode for a vacuum cleaner robot. Different floor types may be stored as images indicating they are not a hazard, and also being tagged with the preferred cleaning mode.

In one embodiment, the robot may determine the image is too dark, or the remote server may indicate this with a request for a better illuminated image. The robot may have a light source that can be directed to the object and can be turned on. The light source could be visible or IR. Alternately, the robot may communicate via WiFi over a home network with a lighting controller to have a light turned on in the room where the object is located.

Machine Learning

In one embodiment, machine learning is used to determine image types and whether they are a hazard. A test environment may be set up with multiple known objects. These objects can both be tagged by a human tester, and also can be identified by test robots probing them, running over them, etc. The test objects are selected from a group typically found on the floor of a home, such as socks, wires, papers, dog poop, dog food, string, pencils, etc., etc.

In one embodiment, the type of room is identified, and the objects are weighted based on their likelihood of being in such a room. For example, a kitchen may be more likely to have food, utensils, etc. A bathroom is more likely to have towels, toothbrushes, etc. A closet is more likely to have socks and other clothing.

CONCLUSION

While the invention has been described with respect to specific embodiments, one skilled in the art will recognize that numerous modifications are possible. Embodiments of the invention may be realized using a variety of computer systems and communication technologies including but not limited to specific examples described herein.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for obstacle avoidance in a mobile robot comprising:
    capturing images of objects with image sensors in mobile robots, wherein the image sensors are mounted on the mobile robots and have a low-profile viewpoint;

transmitting image data corresponding to the images to a remote neural network;

training the remote neural network using machine learning by identifying and adding tags to the objects using training images consisting of the images captured by the mobile robots having the low-profile viewpoint, wherein the remote neural network trained with the training images consisting of the images captured by the mobile robots having the low-profile viewpoint has an increased accuracy of correct object identification compared to a neural network trained with training images including images captured from a high-profile viewpoint;

classifying identified objects by indicating whether the objects are a potential hazard;

creating a library of identified and classified objects;

comparing a new image from an operating mobile robot to the library of identified and classified objects;

identifying a match of the new image to the library of identified and classified objects;

providing a hazard classification to the operating mobile robot; and altering the operation of the operating mobile robot if the hazard classification is received.

2. The method of claim 1 wherein the image data corresponding to the images comprises an intensity data component and a depth data component for each of a plurality of pixels of the images.

3. The method of claim 2 further comprising:

processing the image data to reformat the intensity data component and the depth data component into a single composite data component for each of the plurality of pixels of the images; and providing the single composite data component for each of the plurality of pixels of the images to the remote neural network.

4. The method of claim 3 wherein the data corresponding to the images further comprises providing color information for each pixel.

5. The method of claim 1 wherein at least one of the image sensors is a Photonic Mixer Device and the remote neural network is a multi-layer neural network.

6. The method of claim 1 wherein the operating mobile robot is a cleaning robot and turns off a brush motor when the operating mobile robot passes over one of the objects before the object is classified to indicate whether the object is a potential hazard.

7. The method of claim 1 further comprising:

slowing down a drive motor when the operating mobile robot passes over one of the objects classified as a potential hazard.

8. The method of claim 1 wherein indicating whether the object is a potential hazard comprises a confidence rating.

9. The method of claim 1 further comprising obtaining at least one additional image of the object from a different viewpoint.

10. The method of claim 1 further comprising:

performing image processing to recognize objects in images captured by the image sensors in the mobile robots;

transmitting the images using wireless transceivers in the mobile robots;

tagging locations of the images on a map;

receiving an object classification of the images from a remote object classifier, with the object classification indicating whether the objects are a potential hazard; and returning to and cleaning tagged locations of objects not indicated as a potential hazard with the operating mobile robot.

11. The method of claim 1, wherein a location and characteristics of the objects are known apriori and are used to classify the identified objects.

12. A method for obstacle avoidance in a mobile robot comprising:

capturing images of objects with image sensors in mobile robots, each image among the images is associated with image data comprising a color data component, an intensity data component and a depth data component for each of a plurality of pixels of the images;

processing the image data to reformat the intensity data component and the depth data component into a single composite data component for each of the plurality of pixels of the images;

transmitting the image data corresponding to the images to a remote neural network;

training the remote neural network using machine learning by identifying and adding tags to the objects using the images associated with the image data comprising the single composite data component and the color data component for each of the plurality of pixels of the images;

classifying identified objects by indicating whether the objects are a potential hazard based on the image data comprising the single composite data component and the color data component;

creating a library of identified and classified objects;

comparing a new image from an operating mobile robot to the library of identified and classified objects;

identifying a match of the new image to the library of identified and classified objects;

providing a hazard classification to the operating mobile robot; and altering the operation of the operating mobile robot if the hazard classification is received.

* * * * *